US007702483B2

(12) United States Patent
Duwendag

(10) Patent No.: US 7,702,483 B2
(45) Date of Patent: Apr. 20, 2010

(54) POSITION CONTROL ON BOTTOM LAYERS WITH IMAGE PROCESSING

(75) Inventor: Ruediger Duwendag, Lengerich (DE)

(73) Assignee: Windmoeller & Hoelscher KG, Lengerich (DE)

( * ) Notice: Subject to any disclaimer, the term of this patent is extended or adjusted under 35 U.S.C. 154(b) by 34 days.

(21) Appl. No.: 11/892,470

(22) Filed: Aug. 23, 2007

(65) Prior Publication Data

US 2008/0052025 A1 Feb. 28, 2008

(30) Foreign Application Priority Data

Aug. 23, 2006 (DE) ....................... 10 2006 039 564

(51) Int. Cl.
*G06F 15/00* (2006.01)

(52) U.S. Cl. ...................................................... 702/182

(58) Field of Classification Search ................... 702/81, 702/95, 182; 399/66, 72; 382/100, 275; 347/4

See application file for complete search history.

(56) References Cited

U.S. PATENT DOCUMENTS 5,782,731 A 7/1998 Köhn et al.
2005/0179710 A1* 8/2005 Tatsuta et al. .................. 347/5
2006/0285161 A1* 12/2006 Otsuka ...................... 358/1.18

FOREIGN PATENT DOCUMENTS

DE 195 02 830 A1 8/1996

* cited by examiner

*Primary Examiner*—Bryan Bui
(74) *Attorney, Agent, or Firm*—Jacobson Holman PLLC

(57) ABSTRACT

A method for the attachment or introduction of valve or cover sheets, imprints, coatings and/or embossings in the correct position on or in components of tube pieces has several process steps. The steps include (a) recording of images of the components of several tube pieces with attached or introduced valve or cover sheets, imprints, coatings and/or embossings, (b) determining the positions of the valve or cover sheets, imprints, coatings and/or embossings relative to a reference point of the components of the tube pieces, (c) calculating the deviation of the determined position from the target position and (d) changing the positions of the valve or cover sheets and components of the tube pieces by a value that follows from the calculated deviation.

16 Claims, 2 Drawing Sheets

1.
2.
3.
4.
5.
6.
7.
8
9
10
11
12
13
14
15
16
17
18
19
z

POSITION CONTROL ON BOTTOM LAYERS WITH IMAGE PROCESSING

BACKGROUND OF THE INVENTION

1. Field of Invention

The invention concerns a method and device for positioning of valve or cover sheets relative to components of tube pieces.

2. Description of the Prior Art

Positioning of valve or cover sheets relative to components of tube pieces is important, especially in the production of sacks and bags. Such sacks, which are often prescribed for later filling with bulk products, for example, construction materials like cement, are generally produced by transporting a section of a tube across the tube axis, attaching the end areas, applying a valve strip, for example, gluing it on, then folding the parts of the applied end areas to close the sack end and finally applying bottom cover sheets to the bottoms so formed. If required, one of the two ends can be formed in a different way and it is often not essential to provide a valve on both ends. Bottom cover sheets can be dispensed with, if the strength of a bottom is already sufficient. Such a sack is later filled through the valve or a valve. However, for quality of the sacks often not only the correct position of the valve or cover sheet is important, but also the correct position of the printing, coatings and any glue application and also protrusions or grooves that mark later folding lines. Production of such sacks from tube pieces occurs in devices that are often referred to as bottom-laying devices.

To produce the described sacks the tube pieces are transported across their sack longitudinal axis and in the plane of the tube generally horizontally in a transport device, in which they are kept unmovable relative to the transport device. For this purpose the tube pieces are often clamped in the area of their two ends between the belts of so-called double conveyor belts. The valve sheet and the bottom cover sheet are transported by other transport devices to the tube pieces, in which double conveyors or also cylinders are provided for this purpose, on whose surfaces the valve or bottom cover sheets are transported. Such cylinders can be equipped with suction devices or pincers. At the beginning of the production process all transport devices must be adjusted and tuned to each other so that the valve sheet or bottom cover sheets are placed precisely at the target positions of the components of the tube pieces to be fastened there. In this case not only does the position of the sheet and strips in the transport devices play a role, but so do the transport speeds. For tuning and adjustment on devices according to the prior art random samples are taken at the beginning of production by the machine operator and measured in order to determine the deviations of the actual position from the target positions. The individual transport devices are then adjusted according to the determined deviations in order to minimize the deviations. Adjustment work is also necessary on the devices for printing, coating or embossing! A drawback here is that the adjustment process is time-consuming and the sacks are damaged or even destroyed for control.

DE 195 02 830 A1 proposes a test method for monitoring of deviations. During an unduly large deviation of an actual position from a target position the corresponding sack is later sorted out as reject.

During use of this procedure, however, it has been found in the past that the geometric product tolerances, i.e., the deviations of the actual position or the determined positions from the target positions often vary over a wide range and considerable rejects are therefore produced. In such cases the bottom-laying device can be readjusted, but production must be interrupted again for this purpose.

The task of the present invention is therefore to propose a method and device with which production tolerances can be further minimized without additional time loss and the percentage of rejections reduced.

The task is solved by a method and a device as described herein.

According to it images of the components of several tube pieces and/or units that act on the tube pieces or the components that are applied to the tube piece are initially recorded. These images can be recorded after different production steps during sack production. In this case, for example, each sack can be imaged or only every n-th sack (n>1). One or more images of a sack can be recorded, depending on which positions are to be determined. Thus, it can be useful to record images of the grooved tube pieces before the valve sheet is glued on. After gluing on of the valve sheet another image can be recorded.

In a second step the actual positions of the valve or cover sheets, imprints, coatings and/or embossings are determined relative to a reference point of the tube piece. This reference point is roughly the protruding triangle vertex that forms, when a flat-lying tube piece, which is conveyed across a tube axis but in the plane of the tube, is attached on its ends. The attached end then lies parallel to a plane lying perpendicular to the plane of the tube and orthogonal to the tube axis. The positions in the plane of the attached end are then preferably determined while the positions in the orthogonal direction to this plane have subordinate importance. The difference between the actual positions and the corresponding target positions is then determined in order to obtain the deviations from the target positions.

If, however, a cover sheet to be glued on is imaged on this feed cylinder but no reference point of the tube piece is imaged simultaneously, the actual position must be set with reference to a recorded reference point whose position in space is known. In order to be able to position the image with reference to the tube piece, the tube piece must trigger the recording when it passes a certain location.

A value by which the valve or cover sheet, imprints, coatings and/or embossings are shifted relative to the components of the tube pieces now follows from the calculated deviation. This can occur by movement of the units that carry out the mentioned attachments or introductions. As an alternative or in addition the devices that transport the tube pieces, for example conveyor belts, can also be moved. The transport devices can also be accelerated or braked when the determined deviation lies in the transport direction of the tube pieces.

The value that follows from the determined deviation can be the determined deviation itself.

The deviation is determined on a tube piece on which, however, an influence can no longer be exerted. The position changes therefore concern the following tube pieces. A position change, however, can lead to greater deviations for the following tube pieces, i.e., reverse the desired effect.

In an advantageous variant of the invention it is therefore proposed to determine the value that follows from the determined deviation from a number of deviations, in which an average is formed from this number. An average deviation is therefore calculated by average value formation over several recorded tube pieces. The position of the corresponding unit is then changed so that the corresponding actual position is corrected by the calculated average. This correction can also occur when this average lies within the product tolerance. Not only does position of the unit refer to the spatial position relative to the tube piece, but also the phase position relative to the transport device that transports the tube pieces.

The number of tube pieces over which the average is formed is advantageously the number of tube pieces that are transported during one revolution of a belt for transport of the tube pieces.

In another advantageous variant an average deviation is not calculated from the determined deviations but a deviation function is determined. This deviation function can be dependent on time. The function value of this function at a fixed time can then be the deviation value with reference to an individual sack or individual tube piece, but the deviation values from already measured or still to be measured sacks can also be considered (sliding average formation).

By means of the setup function not only can already determined deviations be reacted to, but also future deviations predicted. This is particularly advantageous, if periodic deviations occur in the bottom-laying devices, for example, synchronism deviations of the transport belts or drive motor. In an advantageous variant the function is also a periodic function. A correction of the actual positions can then also occur periodically by means of a control and regulation unit, in which the value that follows from the determined deviation and is used to adjust the positions is the function value of the function at a specific time.

Recording of images occurs with one or more cameras that can be mounted on the machine frame of the bottom-laying devices. These images recorded by the cameras are sent to an evaluation and computer unit, which determines from the recorded images the positions of the reference point and the actual positions, calculates the deviations from the target positions and determines the average values or functions. These average values are then sent to a control unit which drives the servomechanisms with which the positions of the imprints, coatings, embossings, valve sheets and/or cover sheets can be changed for the attachment or insertion units. These servomechanisms can be motor-adjustable differentials, which can be adjusted during running production so that the correction of the positions can occur without interrupting production. Such differentials, also referred to as compensation drives, are generally used in order to change the phase positions and/or rotational speeds of two components driven by a drive relative to each other. A number of units on a bottom-laying device are often driven by means of a signal drive, which drives a so-called bevel shaft, from which a torque for a unit is taken off.

The aforementioned method according to the invention can be repeatedly conducted in continuous fashion during sack production in order to avoid rejects as fully as possible.

Additional advantageous variants of the invention are apparent from the dependent claims connected to the independent.

A practical example of the invention follows from the description and drawing.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figures 1A, 1B:
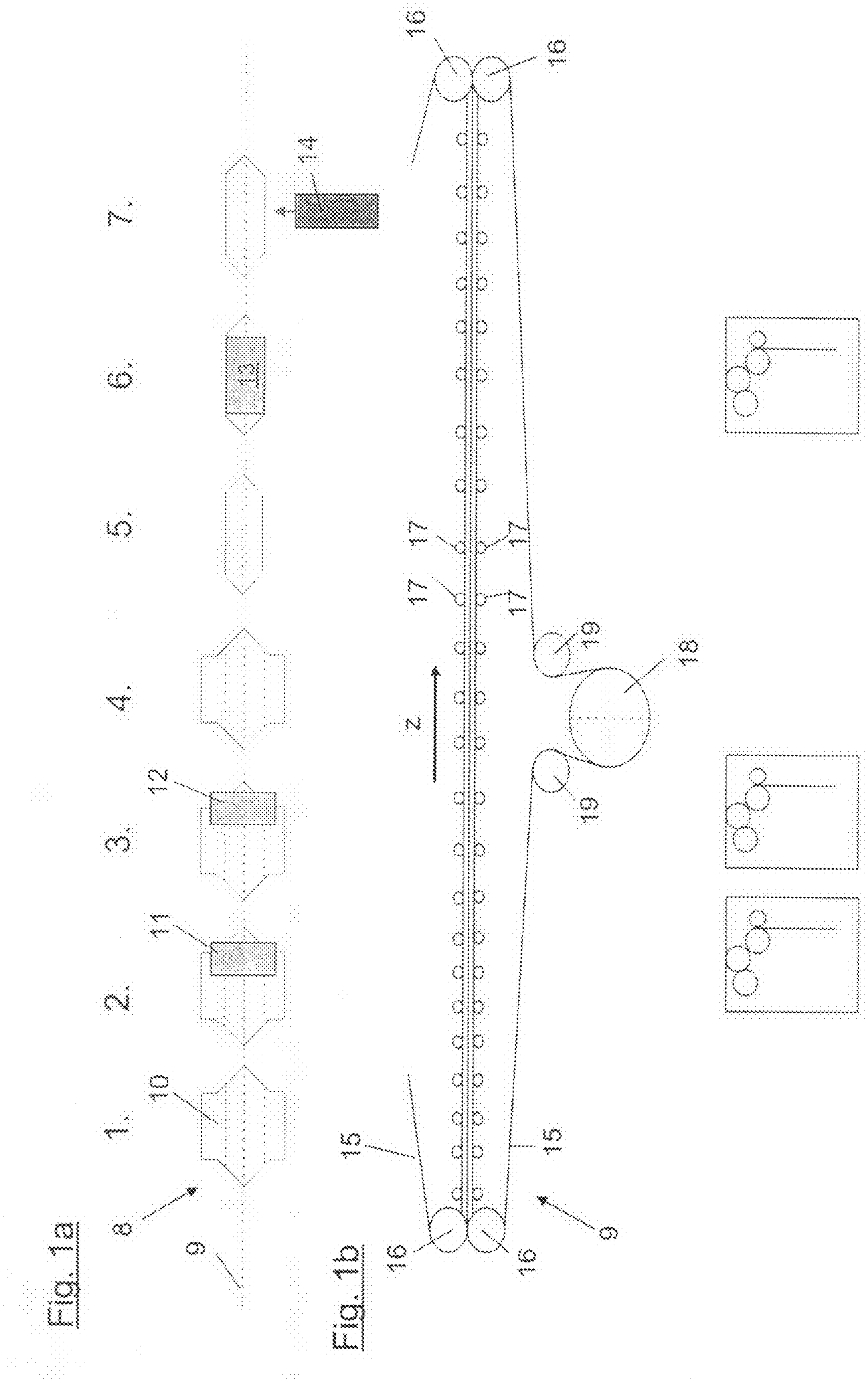
FIG. 1 A sketch in which production of sack bottoms is shown.

FIG. 1*a* shows a sequence of process steps for formation of a valve bottom on a tubular piece. Each process step is then conducted at an assigned workstation, marked with 1 to 7. The tube pieces 8 are conveyed by a double-belt conveyor 9 to the individual workstations, in which the tube axis runs across the feed direction but in the plane of feed. At workstation 1 the tube end is attached so that the now open bottom 10 lies in a plane that runs essentially orthogonal to the tube axis. At workstation 2 a valve sheet 11 is applied to the open bottom 10. At workstation 3 an additional valve sheet 12 is applied. At workstation 4 areas of the bottom 10 are coated with glue in a manner not further shown. Closing of the bottoms then occurs at workstation 5, in which areas of the bottoms are glued to each other based on the applied glue and thus form a permanent bottom. At workstation 6 a bottom cover sheet 13 is applied to the closed bottom. Then, at workstation 7 an imprint is printed on the bottom cover sheet optionally by means of a format cylinder 14. For this purpose the format cylinder 14 can carry raised plates (not shown).

The double-belt conveyor 9 is shown in FIG. 1*b* in greater detail. The double-belt conveyor 9 includes two revolving endless conveyor belts 15 guided over idler pulleys 16. For transport of the tube pieces in the areas of the double-belt conveyor the two conveyor belts are placed one above the other and compressed by roll 17 acted upon by spring forces so that displacement of the tube pieces relative to the conveyor belts is avoided. The drive of the conveyor belts 15 is shown as an example for the lower conveyor belt 15. The drive includes a drive motor (not shown), which drives the drive pulley 18. The conveyor belt 15 is guided over pulleys 19, which are arranged so that the conveyor belt 15 wraps around the drive pulley 18 at least over an angle of 180°.

Figure 2:
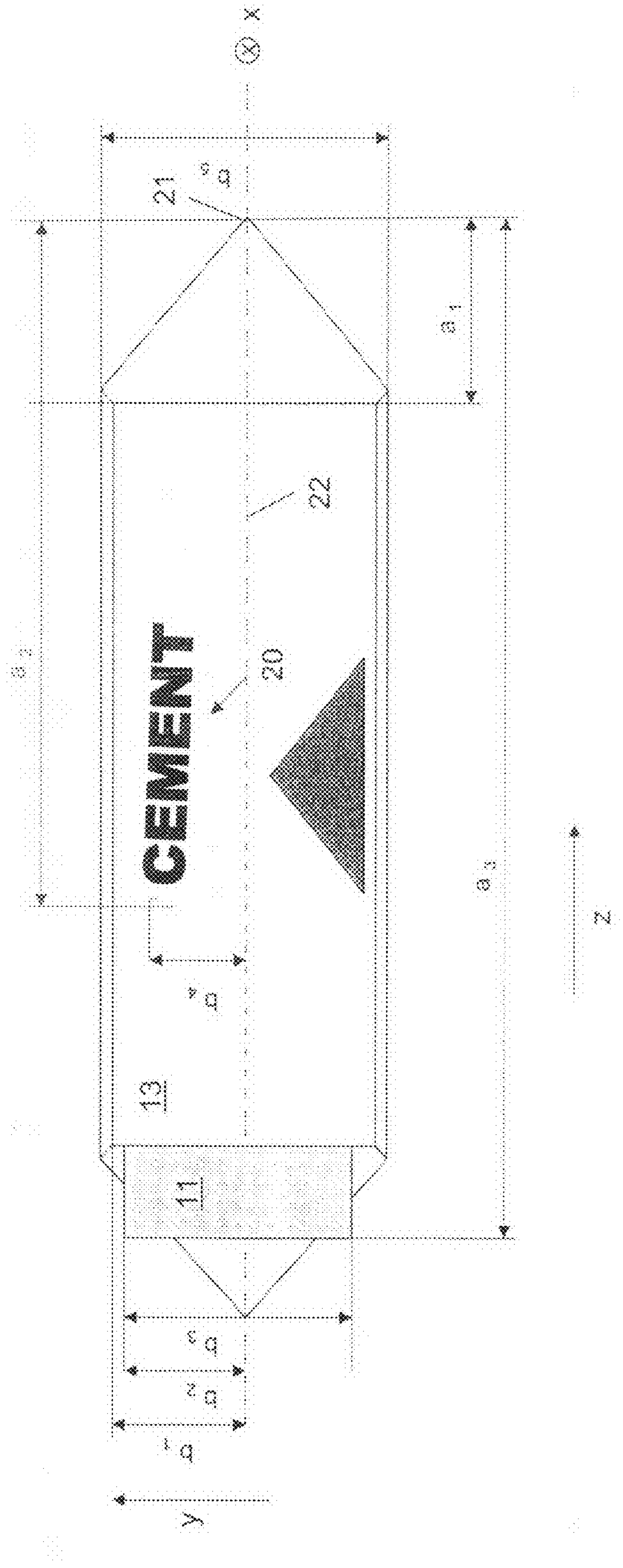
FIG. 2 View of a sack bottom, indicating the parameters controllable during bottom production.

FIG. 2 shows different parameters that are considered during establishment of the position of valve sheet 11, bottom cover sheet 13 and also imprint 20 relative to bottom 8 and which are variable to minimize the manufacturing tolerances in the context of the invention. The reference points of bottom 8 for the corresponding measurements to determine the positions are the vertices 21 of the front bottom triangle viewed in the running direction z and the center line 22 of the bottom, which runs parallel to running direction z. The parameter $a_1$ denotes the distance of the front edge of the bottom cover sheet 13 from vertex 21, parameter $a_2$ denotes the distance between vertex 21 and the front edge of the imprint (in the reading direction) and parameter $a_3$ denotes the spacing between the rear edge of valve sheet 11 from vertex 21. In order to adjust these parameters and minimize their tolerances from the target values, the phase positions of the drive of the transport devices for cover sheet transport and valve sheet transport as well as the phase position of the format rollers 14 relative to the double-belt conveyor are varied. All these components are often driven by a single drive, this drive driving a machine shaft from which the torque to drive the individual transport devices is taken off. In order to be able to change the phase position, a motor-adjustable overlapping drive is provided in which its servomotors can be recorded and regulated in position. If an individual described component has its own drive motor, which operates independently of the machine shaft, the rotational position of this drive motor can be recorded and regulated. This generally occurs via a known rotation sensor.

Parameters $b_1$ and $b_2$ denote the distance from the upper edge of the bottom cover sheet and the valve sheet to center line 22. These positions are adjusted by a motor-produced displacement of the transport devices that transport the bottom cover sheet or valve sheet relative to the double-belt conveyor. The same applies for parameter $b_4$, which denotes the distance between the upper edge of the imprint relative to center line 22, in which for this variation the format roll is displaced axially. Parameter $b_3$ describes the width of the valve sheet 11.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

LIST OF REFERENCE NUMBERS

1 Workstation
2 Workstation
3 Workstation
4 Workstation
5 Workstation
6 Workstation
7 Workstation
8 Tube piece
9 Double-belt conveyor
10 Attached bottom
11 Valve sheet
12 Valve sheet
13 Bottom cover sheet
14 Format cylinder
15 Conveyor belt
16 Idler pulley
17 Roll
18 Drive pulley
19 Pulley
20 Imprint
21 Vertex of bottom triangle
22 Center line
x Direction of tube piece axis
y Direction orthogonal to transport direction z and to the direction of tube axis y
z Transport direction of the tube pieces

What is claimed is:

1. A method for attachment or introduction of valve or cover sheets, imprints, coatings and/or embossings in a correct position on or in components of tube pieces, said method comprising the following process steps:

(a) recording of images of the components of tube pieces with the attached or introduced valve or cover sheets, imprints, coatings and/or embossings;

(b) determining positions of the valve or cover sheets, imprints, coatings and/or embossings relative to a reference position of the components of the tube pieces;

(c) calculating a deviation of the determined positions from the reference positions, the calculated deviation being based on a number of the tube pieces conveyed during one revolution of a transport belt that transports the tube pieces; and (d) changing the positions of the valve or cover sheets and components of the tube pieces by a value based on the calculated deviation.

2. The method according to claim 1, wherein the value that is based on the calculated deviation is determined by calculating an average deviation of the determined positions from the reference positions over several determined positions.

3. The method according to claim 1, wherein the value that is based on the calculated deviations is determined from a function that describes the deviations of the determined positions from the reference positions as a function of time.

4. The method according to claim 3, wherein the function is a periodic function.

5. The method according to claim 1, wherein the positions of the valve or cover sheets and the components of the tube pieces are determined by at least one camera.

6. The method according to claim 1, wherein the change in position occurs through a motorized differential adjustment.

7. The method according to claim 1, wherein determining the value that is based on the calculated deviation is conducted by a computer and control unit.

8. The method according to claim 7, wherein the computer and control unit calculates at least one of an average deviation and a function that describes the deviations of the determined positions from the reference position as a function of time.

9. The method according to claim 8, wherein the change in position occurs through a motorized differential adjustment and wherein the computer and control unit sends control signals to the differential adjustment.

10. A device for positioning of units for attachment or introduction of valve or cover sheets, imprints, coatings and/or embossings on components of tube pieces, said device comprising:

a device to record images of the valve or cover sheets, imprints, coatings and/or embossings and components of the tube pieces;

an evaluation and computer unit to determine relative positions of the valve or cover sheets, imprints, coatings and/or embossings relative to the components of the tube pieces, and to calculate the relative position from several relative positions or to determine a deviation function, the deviation being based on a number of the tube pieces conveyed during one revolution of a transport belt that transports the tube pieces;

a memory unit with which reference positions can be stored; and a device for adjustment of the relative positions.

11. The device according to claim 10, further comprising a control unit which obtains from the computer unit a difference in average relative position and reference relative position and with which the device is supplied with control signals for adjustment.

12. The device according to claim 10, wherein the device that records the images includes an optical measurement system.

13. The device according to claim 12, wherein the optical measurement system is a camera system.

14. A method for attachment or introduction of valve or cover sheets, imprints, coatings, or embossings in a correct position on or in components of tube pieces, said method comprising the following steps:

(a) recording images of the components of tube pieces with the attached or introduced valve or cover sheets, imprints, coatings, or embossings;

(b) electronically determining with a processor positions of the valve or cover sheets, imprints, coatings, or embossings relative to a reference position of the components of the tube pieces;

(c) electronically calculating with the processor a deviation of the determined positions from the reference positions, the calculated deviation being based on a number of the tube pieces conveyed during one revolution of a transport belt that transports the tube pieces; and (d) changing the positions of the valve or cover sheets and components of the tube pieces by a value based on the calculated deviation.

15. The method according to claim 14, wherein the value that is based on the calculated deviation is determined by calculating an average deviation of the determined positions from the reference positions over several determined positions.

16. The method according to claim 14, wherein the step of recording the images employs a camera.

* * * * *